US011999447B1

(12) United States Patent
Cifers, III

(10) Patent No.: US 11,999,447 B1
(45) **Date of Patent: *Jun. 4, 2024**

(54) ACCESSORY MOUNTING TRACK

(71) Applicant: YakAttack, LLC, Farmville, VA (US)

(72) Inventor: Luther Cifers, III, Farmville, VA (US)

(73) Assignee: YakAttack, LLC, Farmville, VA (US)

( * ) Notice: Subject to any disclaimer, the term of this patent is extended or adjusted under 35 U.S.C. 154(b) by 312 days.

This patent is subject to a terminal disclaimer.

(21) Appl. No.: 17/221,318

(22) Filed: Apr. 2, 2021

Related U.S. Application Data

(63) Continuation of application No. 15/825,083, filed on Nov. 28, 2017, now Pat. No. 10,967,939, which is a continuation of application No. 14/822,574, filed on Aug. 10, 2015, now Pat. No. 9,828,073, which is a continuation-in-part of application No. 13/954,253, filed on Jul. 30, 2013, now Pat. No. 9,671,060.

(60) Provisional application No. 61/677,455, filed on Jul. 30, 2012, provisional application No. 61/680,254, filed on Aug. 6, 2012.

(51) Int. Cl.

| | |
|---|---|
| ***B63B 34/20*** | (2020.01) |
| ***B60R 11/00*** | (2006.01) |
| ***B63B 17/00*** | (2006.01) |
| ***B63B 34/26*** | (2020.01) |
| ***F16B 2/06*** | (2006.01) |
| ***F16M 11/14*** | (2006.01) |
| ***F16M 11/20*** | (2006.01) |
| ***F16M 13/02*** | (2006.01) |

(52) U.S. Cl.
CPC .............. *B63B 34/20* (2020.02); *B60R 11/00* (2013.01); *B63B 17/00* (2013.01); *F16B 2/065* (2013.01); *F16M 11/14* (2013.01); *F16M 11/2085* (2013.01); *F16M 13/02* (2013.01); *B63B 34/26* (2020.02)

(58) Field of Classification Search
CPC ... B63B 17/00; B63B 35/71; B63B 2035/715; B63B 34/20; B63B 34/26; F16B 2/06; F16B 2/065; F16M 13/02; F16M 13/022
See application file for complete search history.

(56) References Cited

U.S. PATENT DOCUMENTS

| | | | |
|---|---|---|---|
| 585,475 A | 6/1897 | Huber | |
| 1,705,086 A | 3/1929 | Ferguson | |
| 2,157,309 A | 5/1939 | Swedman et al. | |
| 2,176,644 A | 10/1939 | Sladek | |
| 2,269,847 A | 1/1942 | Feinson | |
| 2,859,710 A | 11/1958 | Elsner | |
| 2,928,512 A * | 3/1960 | Slater .................... | F16B 7/0446 403/22 |

(Continued)

FOREIGN PATENT DOCUMENTS

| | | |
|---|---|---|
| FR | 2606842 A1 | 4/1978 |
| JP | H1060755 A | 3/1998 |
| JP | 2002180412 A | 6/2002 |

*Primary Examiner* — Ajay Vasudeva
(74) *Attorney, Agent, or Firm* — Thedford I. Hitaffer; Hitaffer & Hitaffer, PLLC

(57) ABSTRACT

An accessory mounting track provides quick and easy removable attachment and positioning of various devices. The method of attachment of devices to the accessory mounting track may be compatible with the attachment of these devices to other mounting systems, allowing the accessory mounting track to be used interchangeably with those systems.

23 Claims, 7 Drawing Sheets

(56) References Cited

U.S. PATENT DOCUMENTS 3,129,751 A 4/1964 Alexander
3,208,560 A 9/1965 Cote
3,291,088 A 12/1966 Klose
3,331,348 A 7/1967 Dyer
3,381,925 A 5/1968 Higuchi
4,106,680 A * 8/1978 Bott .......................... B60R 9/04 248/222.52
4,126,228 A 11/1978 Bala et al.
4,183,387 A 1/1980 Lenz
4,226,394 A 10/1980 Einhorn
4,244,501 A 1/1981 Ingram
4,273,487 A 6/1981 Mclennan
4,315,393 A * 2/1982 Schack ................. E04B 1/4128 411/908
4,616,771 A 10/1986 Heideman
4,699,484 A 10/1987 Howell et al.
4,835,852 A 6/1989 Asplund et al.
4,969,784 A 11/1990 Yanke
5,026,013 A 6/1991 Robbins
5,222,851 A 6/1993 Dickerson
5,244,186 A 9/1993 Chandler
5,305,700 A 4/1994 Strong et al.
5,421,036 A 6/1995 Stevens et al.
5,487,518 A 1/1996 Mccraney et al.
5,582,381 A * 12/1996 Graf ....................... B60N 2/075 248/430
5,598,959 A 2/1997 Lorensen et al.
5,676,088 A 10/1997 Blaisdell et al.
5,864,997 A 2/1999 Kelly
6,019,543 A 2/2000 Junker
6,021,984 A 2/2000 Mills
6,086,300 A 7/2000 Froehlich
6,238,153 B1 5/2001 Karrer
6,290,426 B1 9/2001 Gijsel et al.
6,398,149 B1 6/2002 Hines et al.
6,460,743 B2 10/2002 Edgerly et al.
6,585,465 B1 7/2003 Hammond et al.
6,644,901 B2 11/2003 Breckel
6,736,300 B2 5/2004 Deakin
6,938,782 B2 9/2005 Dean et al.
7,044,701 B2 5/2006 Herb
7,070,374 B2 7/2006 Womack et al.
7,401,995 B2 7/2008 Senakiewich, II et al.
7,497,651 B2 3/2009 Harberts et al.
7,621,487 B2 11/2009 Brown et al.
7,757,914 B2 7/2010 Book et al.
D622,208 S 8/2010 Sautter et al.
D635,086 S 3/2011 Shen
8,100,600 B2 1/2012 Blum
8,196,789 B2 6/2012 Kraeuter et al.
8,647,009 B2 * 2/2014 Kobayashi .............. F24S 25/61 52/173.3
D703,605 S 4/2014 Sautter et al.
8,763,978 B2 7/2014 Newman et al.
8,974,160 B2 3/2015 Bender
D731,400 S 6/2015 Condon et al.
9,187,047 B2 11/2015 Sautter et al.
9,365,150 B2 6/2016 Baldsiefen et al.
9,671,060 B1 6/2017 Cifers
9,828,073 B1 11/2017 Cifers
9,863,576 B1 1/2018 Cifers
9,879,819 B1 1/2018 Cifers
D814,388 S 4/2018 Salsi et al.
10,155,306 B1 12/2018 Carnevali
10,429,002 B2 10/2019 Carnevali
10,473,150 B2 11/2019 Carnevali et al.
10,563,813 B1 2/2020 Cifers
10,967,939 B1 * 4/2021 Cifers, III .............. F16M 13/02
2001/0008600 A1 7/2001 Fraleigh
2003/0156919 A1 8/2003 Schwarz et al.
2004/0131440 A1 7/2004 Womack et al.
2004/0165947 A1 8/2004 Herb
2005/0269465 A1 12/2005 Carnevali
2006/0175595 A1 8/2006 Carnevali
2007/0119887 A1 5/2007 Foley
2007/0194191 A1 8/2007 Persson et al.
2009/0224119 A1 9/2009 Heffernan
2009/0279944 A1 11/2009 Schmitz et al.
2010/0078454 A1 4/2010 Sautter et al.
2010/0150484 A1 6/2010 Watson
2010/0192505 A1 8/2010 Schaefer et al.
2011/0031370 A1 2/2011 Carnevali
2011/0139841 A1 6/2011 Sautter et al.
2012/0045276 A1 2/2012 Carnevali
2014/0003878 A1 1/2014 Knox et al.
2015/0030386 A1 1/2015 Carnevali
2016/0186925 A1 6/2016 Bettin
2017/0089058 A1 3/2017 Roth

* cited by examiner

ACCESSORY MOUNTING TRACK

CROSS-REFERENCE TO RELATED APPLICATIONS

This application is a continuation application of pending U.S. patent application Ser. No. 15/825,083, filed Nov. 28, 2017, which is a continuation application of U.S. patent application Ser. No. 14/822,574, filed Aug. 10, 2015, patented as U.S. Pat. No. 9,828,073 on Nov. 28, 2017, which is a continuation-in-part application of pending U.S. patent application Ser. No. 13/954,253, filed Jul. 30, 2013, patented as U.S. Pat. No. 9,671,060 on Jun. 6, 2017, which claims the benefit of U.S. Provisional Application No. 61/677,455, filed Jul. 30, 2012, and U.S. Provisional Application No. 61/680,254, filed Aug. 6, 2012, the disclosures of which are incorporated herein by reference.

BACKGROUND

This invention relates in general to the connection of accessory devices to vehicles or structures, and more particularly, to an accessory mounting track that may be fixed to an environment, providing a secure attachment point for various accessories.

Devices, such as camera mounts, fishing rod holders, personal electronics cradles, marine depth finders, visibility beacons, and various other implements, frequently require quick and easy attachment and removal from structures and vehicles, such as personal watercraft, boats, all-terrain vehicles, airplanes, automobiles, military vehicles and other vehicles and structures utilizing such devices.

In addition to these devices, other items associated with various environments are commonly stored and organized. Many other environments contain a variety of items that need to be stored or organized. Within the scope herein, the term "device" shall refer to any item that may be stored or organized in a given environment, or a bracket designed to support such an item.

In some cases, it may be desirable to alter the deployment configuration of these devices, either by arrangement or position. It may also be desirable to interchangeably attach these devices to fixed mounts and track systems, with the fixed mount providing a rigid single point of attachment and the track system providing a range of deployment positions that may be altered during attachment or while being used in the field.

These devices have long been attached using a variety of methods, including direct and non-removable attachment to the environment, or removable attachment by means of a variety of mounting systems. While track systems have been utilized in some applications, they generally require tracks specifically designed for or fabricated into the vehicle or structure. The designs of these tracks make them unsuitable for surface mounting to environmental surfaces not designed to accept such a track and as a result are unstable and inadequate for such installations.

While there are existing methods of removable attachment for these devices, the scope of compatibility for those methods may be generally limited by the design of the attachment method, which may inhibit aforementioned versatility in deployment of the devices.

There remains a need for an accessory track that provides a secure means of removable attachment, utilizing a small profile designed for surface mounting.

SUMMARY

The present invention relates to an accessory mounting track that provides quick and easy removable attachment and positioning of various devices. The method of attachment of devices to the accessory mounting track may be compatible with the attachment of these devices to other mounting systems, allowing the accessory mounting track to be used interchangeably with those systems.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
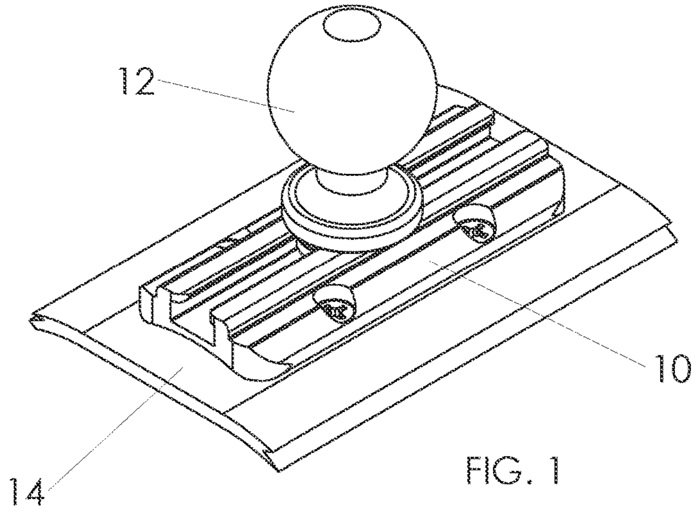
FIG. 1 is a perspective view of an accessory mounting track attached to a supporting environmental surface with a device attached to the accessory mounting track.

Referring now to the drawings, there is illustrated in FIG. 1 an accessory mounting track 10 for removably attaching a device 12 or multiple devices to a supporting environmental surface 14. Exemplary devices are shown in U.S. patent application Ser. No. 13/897,916, filed May 20, 2013, entitled Monopod Turret Support, and U.S. patent application Ser. No. 13/476,441, filed May 21, 2012, published as US Patent Application Publication No. 2012/0293990, entitled Fold-Up Beacon and Associated Post for Vehicles, the disclosures of which are incorporated herein by reference. An additional device is disclosed for example in U.S. Provisional Application No. 61/680,254, entitled Accessory Mounting System.

It shall be observed that the device 12 shown is an example (e.g., a ball for a ball and socket mounting system) of a device that may be attached to the accessory mounting track 10, but a number of devices of many sizes, shapes, and uses, or brackets designed to clamp or support such devices, could be used instead of or in addition to the device 12. The depiction of the device 12 shall not in any way be construed as a limitation as to the size, shape, or type of device that could be attached to the accessory mounting track 10.

The supporting environmental surface may be part of a vehicle, such as a boat or kayak, for example. The supporting environmental surface may alternately be part of a structure, such as a wall in a building or an armrest of a tree stand, for example. It shall be observed that the supporting environmental surface 14 is a graphical representation of an example of such a surface, but that it does not limit in any way the size, shape, or configuration of possible supporting environmental surfaces or the method of attachment to such surfaces.

Figure 2:
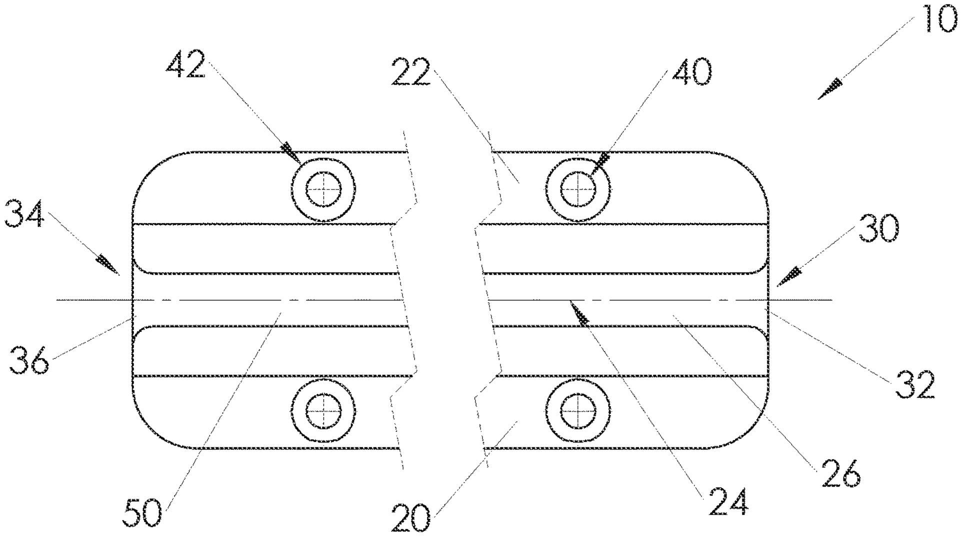
FIG. 2 is a top plan view of an accessory mounting track.
Figure 3:
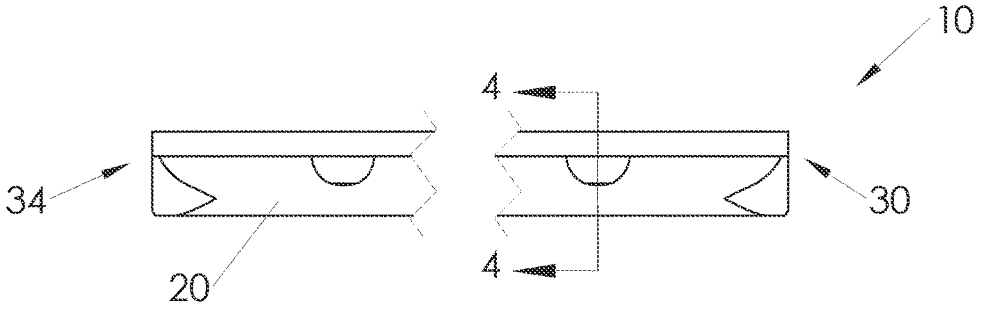
FIG. 3 is an elevational view of the accessory mounting track shown in FIG. 2.

Referring now to FIG. 2, the accessory mounting track 10 may be comprised of a left support flange 20, a right support flange 22, and a central axis 24, which is substantially parallel to a slot channel 50. The accessory mounting track 10 may also comprise a proximal end 30 and a distal end 34 with a proximal slot entry point 32 and a distal slot entry point 36.

It may be mentioned at this point that, for the scope of this entire disclosure, orientation terms, such as "proximal" and "distal" or "left" and "right", refer to their subject matter as semantic conveniences only and not as a necessary condition of the accessory mounting track 10, as the accessory mounting track 10 may obviously be utilized in any desired position or orientation.

The accessory mounting track 10 may also comprise attachment holes 40 linearly disposed parallel to the central axis 24 near the outermost edges of the left support flange 20 and the right support flange 22. The attachment holes 40 may have a countersink feature 42 or a counter bore feature (not shown).

Figure 4:
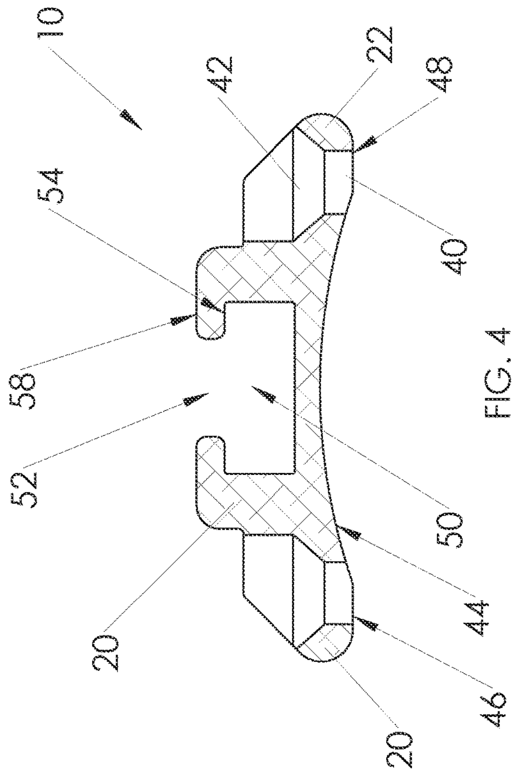
FIG. 4 is an enlarged cross-sectional view taken along the line 4-4 in FIG. 3.

Referring now to FIG. 4, the accessory mounting track 10 may have a concave recess 44, which may terminate at a left interface flat 46 and a right interface flat 48 on the bottom of the left support flange 20 and right support flange 22, respectively. The left interface flat 46 and right interface flat 48 may be approximately aligned with the attachment holes 40 in the corresponding left support flange 20 and right support flange 22. This arrangement may maximize the opportunity for the left interface flat 46 and the right interface flat 48 to have firm contact with the supporting environmental surface 14. Because of the relatively wide spacing between the left interface flat 46 and right interface flat 48, high lateral stability may be achieved. The concave recess 46 may minimize the opportunity for a curved or irregular supporting environmental surface 14 to make contact in regions between the left interface flat 46 and right interface flat 48.

The accessory mounting track 10 may also comprise a slot channel 50, which may have a slot opening 52, which may be bounded on each side by a containment ledge 54.

Figure 5:
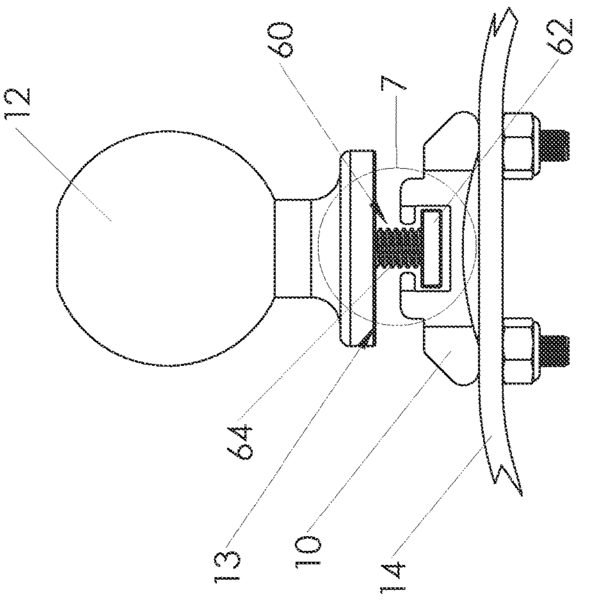
FIG. 5 is a partially exploded end view of the components shown in FIG. 1.
Figure 7:
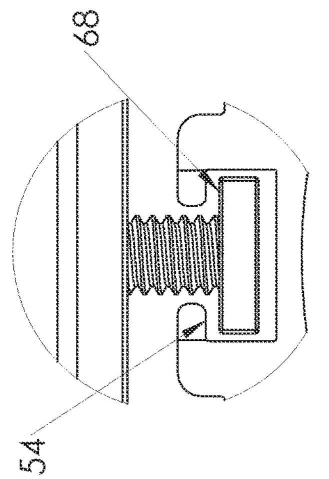
FIG. 7 is an enlarged view of the detail referenced as 7 in FIG. 5.

Referring now to FIG. 5, a device 12 is shown being attached to the accessory mounting track 10. There is a tee-bolt 60 comprising a head 62 and a stud 64 threaded into the device 12. The tee-bolt 60 is in the slot channel 50, oriented so that the stud 64 is in the slot opening 52. In the state shown in FIG. 5, the device 12 may be positioned along the central axis 24 (shown in FIG. 2), with the slot channel 50 containing the tee-bolt 60 within it, but not preventing movement along the central axis 24.

Figure 6:
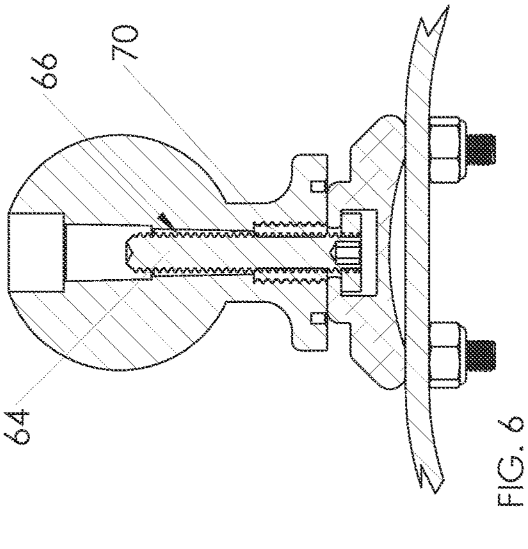
FIG. 6 is similar to FIG. 5 except it is not exploded and is shown at a section cut through the center of the device.

Looking now at FIG. 6, the device 12 is shown after being fully installed on the accessory mounting track 10. The device 12 has female threads 70, which are threaded onto the stud 64 of the tee-bolt 60.

It should be appreciated that by rotating the device 12, the threads 66 of the stud 64 interact with the female threads 70, which may urge the device 12 towards or away from the head 62 of the tee-bolt 60, depending on the direction of rotation. When appropriately rotated, the device 12 is urged towards the head 62 of the tee-bolt 60 until the mounting surface 13 of the device 12 contacts the track upper surface 58 (shown in FIG. 4) of the accessory mounting track 10 and the head upper surface 68 contacts the containment ledge 54. When the device is turned further, friction is increased between these surfaces, which effectively locks the device 12 in position. By rotating the device 12 in the opposite direction, the friction is eliminated and the device 12 may once again be positioned along the central axis 24 or removed from the track through the slot opening or by sliding it out of either end of the accessory mounting track 10.

Figure 8:
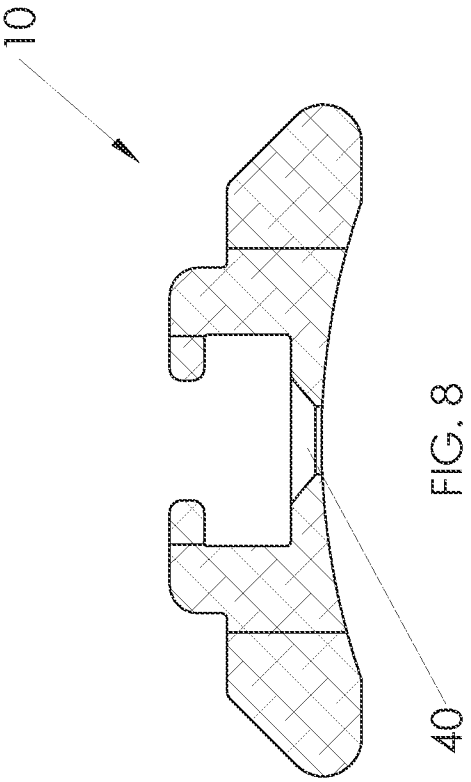
FIG. 8 is a cross-section of the accessory mounting track showing a counter bored attachment hole approximately centered and along the longest axis of the track.

The accessory mounting track 10 may comprise an extruded profile with attachment holes 40. The length of the track 10 may vary as may the number of attachment holes 40. The attachment holes 40 may be disposed linearly near the outer edges of the track 10 or linearly, approximately centered and along the longest axis of the track 10 (see FIG. 8). The attachment holes 40 may be of counter bore or countersink type or may be simple thru holes. The recess 44 may be concave, angular, or another shape, allowing clearance for attaching to rounded or irregular surfaces and maximizing stability by enabling the supporting environment to contact the track 10 along the edges. The region near the outer edges of the underside of the track 10 may be flat and approximately aligned with the rows of attachment holes 40 to maximize lateral stability.

The track 10 composition may be of a lightweight material, such as aluminum or plastic, or a composite comprising two or more such materials. The surface of the track 10 may be treated for harsh environmental exposure, such as UV radiation and saltwater. The upper surface of the track 10 may be textured with any suitable texture to improve the gripping characteristics of that surface, which may increase resistance to accessories mounted to that surface from slipping either by rotation or linearly along the axis of the track 10. This texture may be the result of geometry in the track shape, such as ridges or grooves in the surface. Alternately or in addition to this geometry, the texture may be the result of etching, application of plastic or rubberized coating, or other surface treatments.

Attachment of the track 10 to the support surface may be achieved by putting screws or other suitable fasteners through one or more of the attachment holes 40 and into the surface on which the track 10 is to be mounted. In some configurations, the track 10 may be attached to an adapter bracket, such as a rail clamp, for attachment to the environment, or molded or integrated into the support surface.

The track profile may contain an internal C-shaped slot or other suitable shape to receive a tee-bolt, sliding nut, or other connecting feature internally with which to attach accessory devices.

The tee-bolt 60 may be attached to the device 12 by screwing the threaded stud 64 of the tee-bolt 60 into the device 12, leaving the head 62 of the tee-bolt 60 extended some distance from the device 12.

Attachment of the device 12 to the track 10 may be achieved by inserting the head 62 of the tee-bolt 60 into a slot 50, from either the proximal slot entry point 32 or the distal slot entry point 36. The C-shape of the slot 50 may captivate the head 62 of the tee-bolt 10, allowing movement only along the long axis of the track 10. Once positioned, the device 12 may be immovably tightened to the track 10 by rotating the device 12. The interaction between the threads in the device 12 and those on the stud 64 urges the head 62 of the tee-bolt 60 towards the device 12, thus causing the head 62 of the tee-bolt 60 to contact the inside of the slot 50 and causing the device 12 to contact the upper surface of the track 10 opposite of the slot 50. Further rotation of the device 12 creates pressure on these areas of contact, the resulting friction of which, with reasonable tightening force, is adequate to inhibit rotation of the device 12 in either the tightening or the loosening direction or from slipping linearly along the track 10. As previously mentioned, texture on the mounting surface of the track 10 may increase this friction.

It should be understood that although a tee-bolt attachment method is depicted in these drawings, other methods of secure and removable attachment of devices to the accessory mounting track 10 may also be used. For example, in an alternate configuration, a slot nut and stud configuration (not shown) may be used instead of a tee-bolt. In this configuration, the slot nut is inserted into the slot 50 instead of the head of the tee-bolt. The slot nut is not permanently attached to the stud as it is in the tee-bolt configuration, but instead has female threads which interact with a stud, resulting in a tightening effect that is to that of the tee-bolt configuration.

In applications in which excessive rotational forces may be applied to the device 12, an external locking mechanism (not shown) may be used to prevent the device 12 from rotating in the loosening direction. Also, mechanical features (e.g., grooves, serration, or teeth) may be incorporated into some surface on or surfaces on the track that cooperate with corresponding features on the device 12, or that encourage increased friction between the track and the device.

On the sides of the track there may be grooves in a dovetail, radial, or other shape (not shown), which may allow attachment of devices by externally clamping the track 12, in cooperation with or independent of the C-shaped slot 50 described above. In this application, the device 12 may have features that cooperate with the grooves so that when it is tightened, the features in the device 12 will mechanically interlock with the grooves.

The ends of the track 10 may be contoured to remove edges that may cause injury or snags or may be angled in such a way that interference of gear, persons or other external items is minimized.

Figure 9:
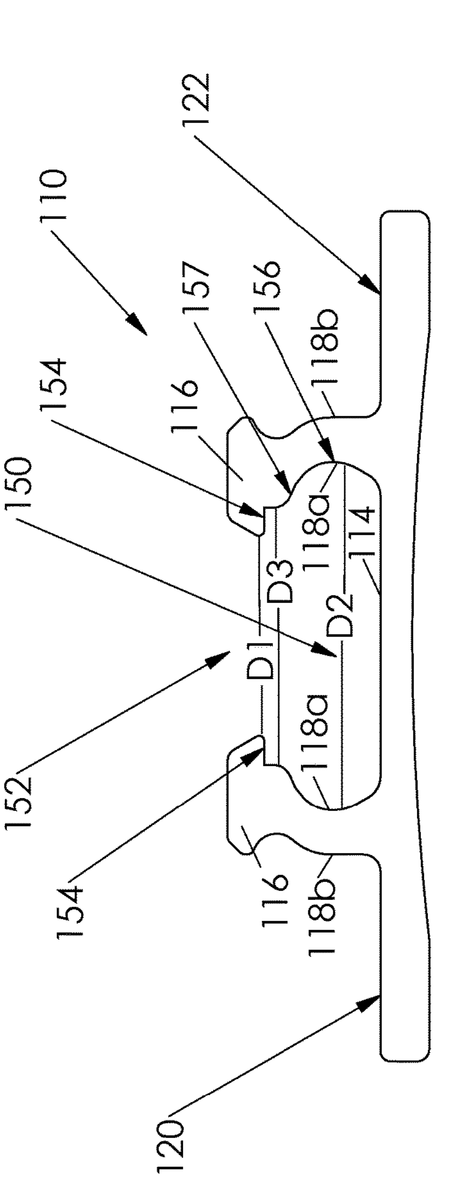
FIG. 9 is an elevational view of an alternative accessory mounting track.

Now, with reference to FIG. 9, there is illustrated an alternative accessory mounting track 110 (e.g., a top-loading track), which may comprise features that enable the insertion of a tee bolt 60 (shown in FIG. 11) through a gap or slot opening 152 into a space, slot or slot channel 150 (e.g., of a top-loading track section 112) within the accessory mounting track 110. This insertion of a tee bolt 60 through a slot opening 152 may be referred to as "top loading" and differs from the insertion of a tee bolt 60 into the previously described accessory mounting track 10, which may require insertion of the tee bolt 60 at either the proximal slot entry point 32 or the distal slot entry point 36 of the accessory mounting track 10, as described above.

The accessory mounting track 110 is a top-loading mounting track provided for removably attaching and positioning one or more mount assemblies or accessory devices (e.g., mount assembly or accessory device with mount 12 shown in FIGS. 11-16) to a supporting surface with a retention element (e.g., fastener 60) comprising an elongate member or threaded stud having male threads and a flange or head 62 fixedly attached to the threaded stud.

The accessory mounting track 110 is provided for removably attaching and positioning one or more accessory devices (e.g., accessory device 12 shown in FIGS. 11-16) to a supporting surface with a retention element (e.g., fastener 60) comprising an elongate member or threaded stud having male threads and a flange or head 62 fixedly attached to the threaded stud.

The accessory mounting track 110 may be comprised of a base 114, opposingly disposed, laterally spaced beams 116, and rails 118 extending from the base 114. Each one of the rails 118 connects the base 114 to a respective one of the beams 116. Each one of the beams 116 extends over a portion of the base 114 toward the other beam 116. Each of the beams has a top surface 117 and an opposing bottom surface 154. The beams 116 are laterally spaced apart be a gap defining the slot opening 152, defined by a first distance D1.

Each one of the rails 118 comprises an inner rail wall **118*a* and an opposing outer rail wall 118*b*. The inner rail wall 118*a* of each of the two rails 118 defines an insertion-pocket portion or clearance pocket 156 extending towards or in a direction of a respective one of the outer rail walls 118*b*, and a guide-surface portion or slot guide 157 extending in a direction away from a respective one of the outer rail walls 118*b*, from the insertion-pocket portion 156 to an intersection with the bottom surface 154 of a respective one of the two beams 116**.

The insertion-pocket portions 156 are laterally spaced apart from each other by a second distance D2 that is larger than the first distance D1 and the intersections of the guide-surface portions 157 with the respective bottom surfaces 154 of the two beams 116 are laterally spaced apart from each other by a third distance D3 that is larger than the first distance D1 and smaller than the second distance D2.

Figure 10:
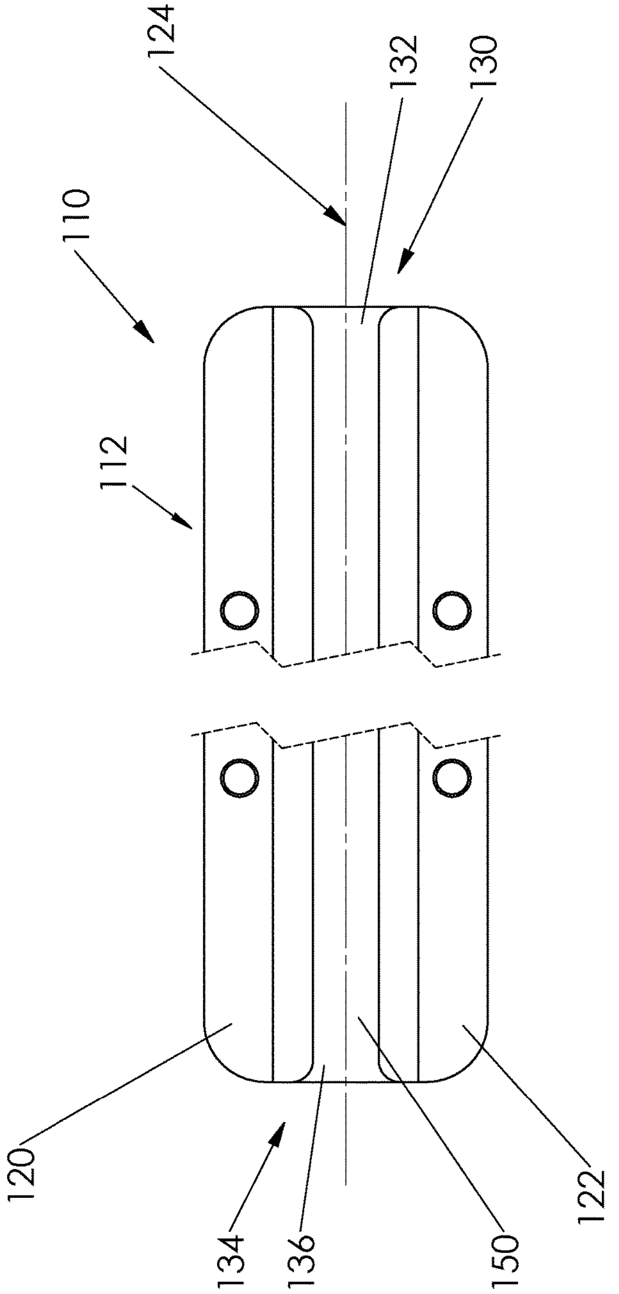
FIG. 10 is a top plan view of the alternative accessory mounting track shown in FIG. 9.

Referring now to FIG. 10, the alternative accessory mounting track 110 may comprise a left support flange 120, a right support flange 122, and a central axis 124, which is substantially parallel to the slot 150. The alternative accessory mounting track 110 may also comprise a proximal end 130 and a distal end 134 with a proximal slot entry point 132 and a distal slot entry point 136.

Referring back to FIG. 9, the slot opening 152 may be bounded on each side by the containment ledge 154. The clearance pocket 156 may also be present on one or more sides of the slot 150 and the slot guide 157 may exist between the clearance pocket 156 and containment ledge 154.

Considering now the top loading function of the alternative accessory mounting track 110, we look now to FIGS. 11-16, which may illustrate, in progressive fashion, the connection of a device 12 to the alternative accessory mounting track 110, by inserting the tee bolt 60 through the slot opening 152 into the slot 150.

Figure 11:
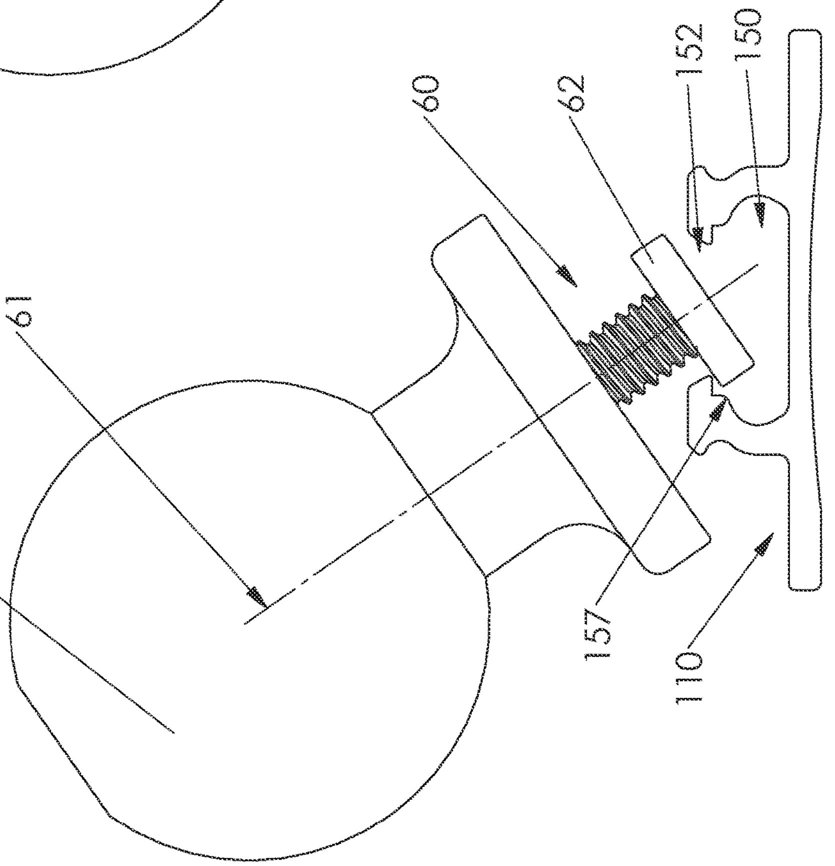
Figure 14:
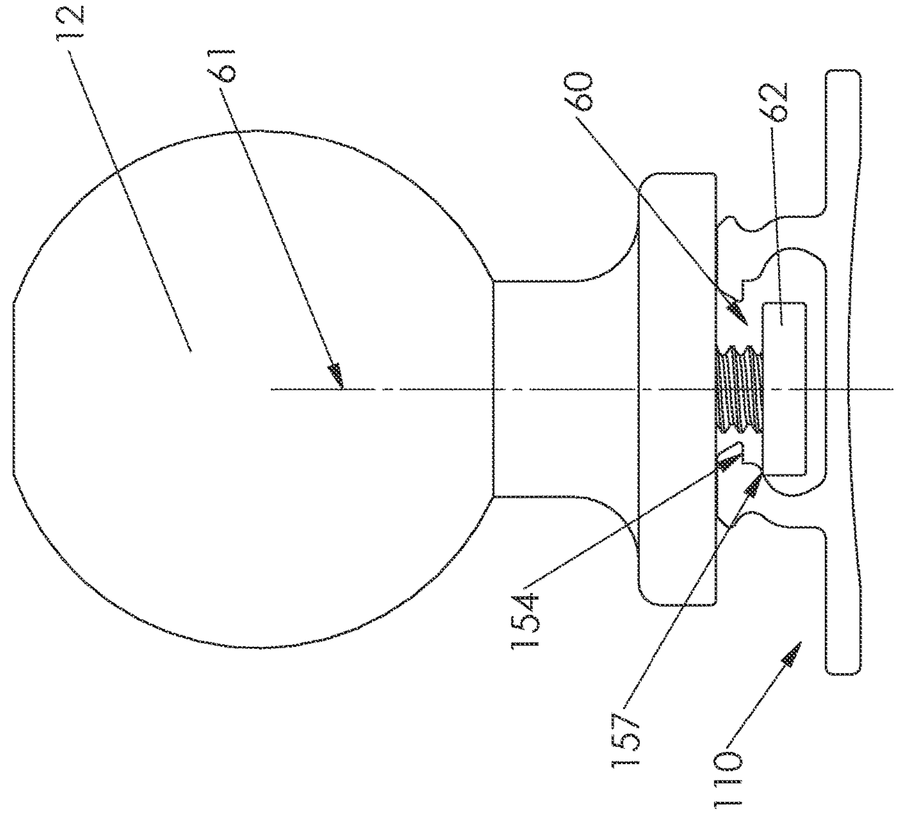

Starting with FIG. 11, we see that the tee bolt 60 is introduced to the alternative accessory mounting track 110 in such a manner that the axis 61 of the tee bolt 60 is angled with respect to the alternative accessory mounting track 110. This arrangement may enable the insertion of the head 62 of the tee bolt 60 through the slot opening 152 and into the slot 150. The retention element (e.g., tee-bolt 60) comprises a flange (e.g., head 62) with at least one dimension that is greater than the first distance D1 of the gap 152 between the two beams 116 of the top-loading mounting track 110 and at least one dimension that is less than the second distance D2 between the insertion-pocket portions 156 of the two rails 118 of the top-loading mounting track 110. The retention element 60 is configured and arranged for insertion into the top-loading mounting track 110 by passing the retention element 60 through the gap 152 between the two beams 116 of the top-loading mounting track 110 from a position over the top surfaces 117 of the two beams 116.

Figure 12:
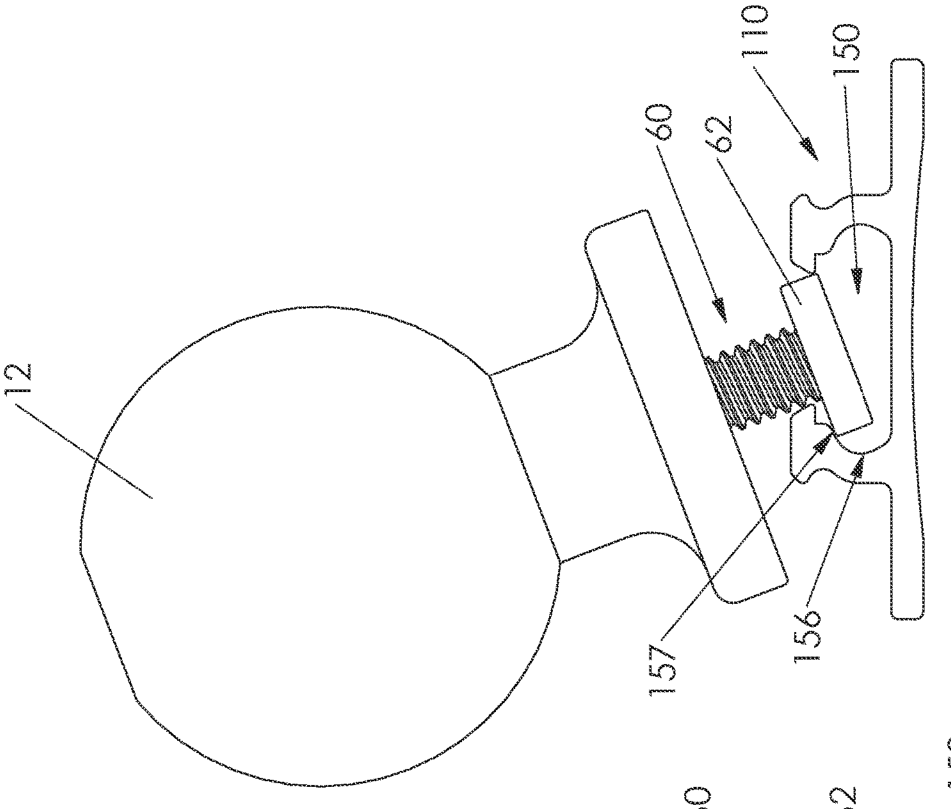
FIGS. 11-16 are reduced scale elevational views of the alternative accessory mounting track shown in FIG. 9, progressively demonstrating the insertion of a fastener into a slot channel through a slot opening.
Figure 13:
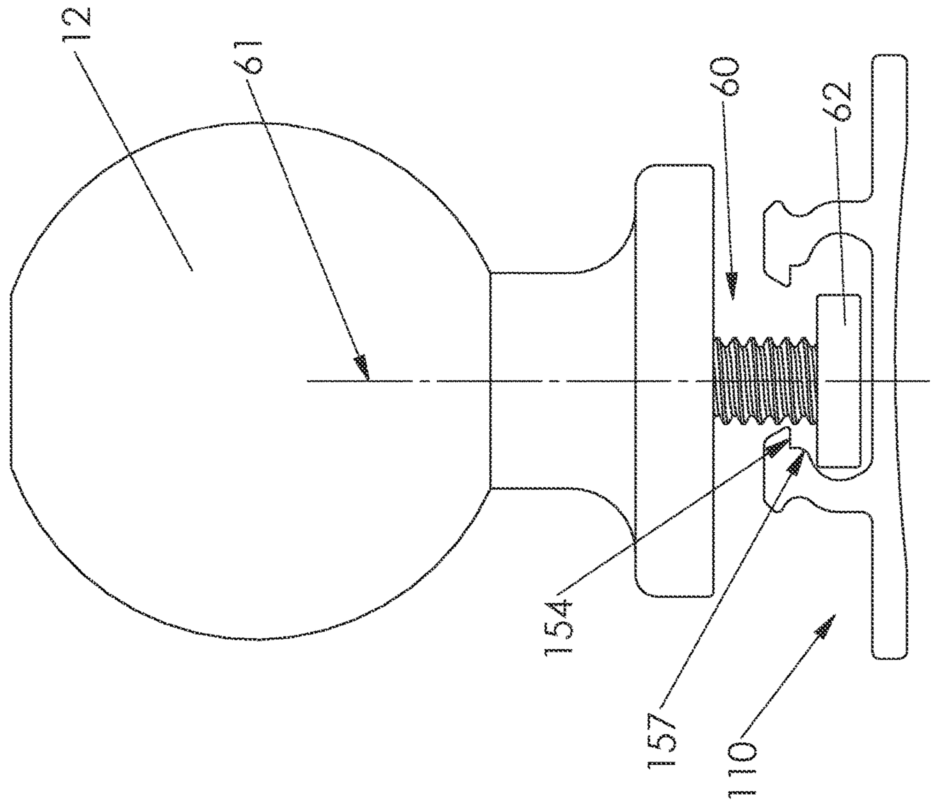
Figure 16:
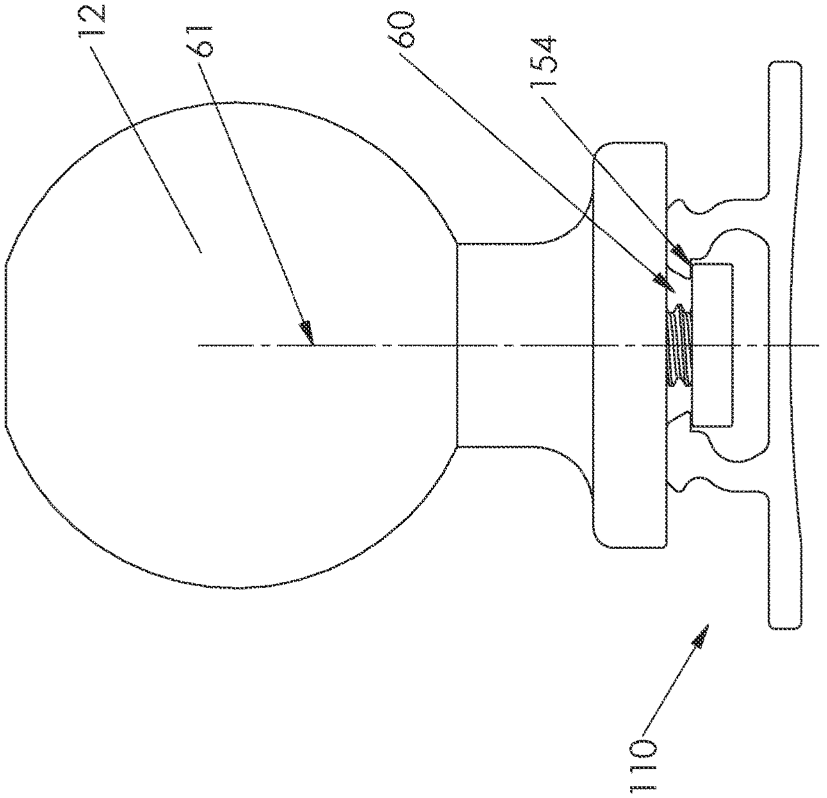
Figure 15:
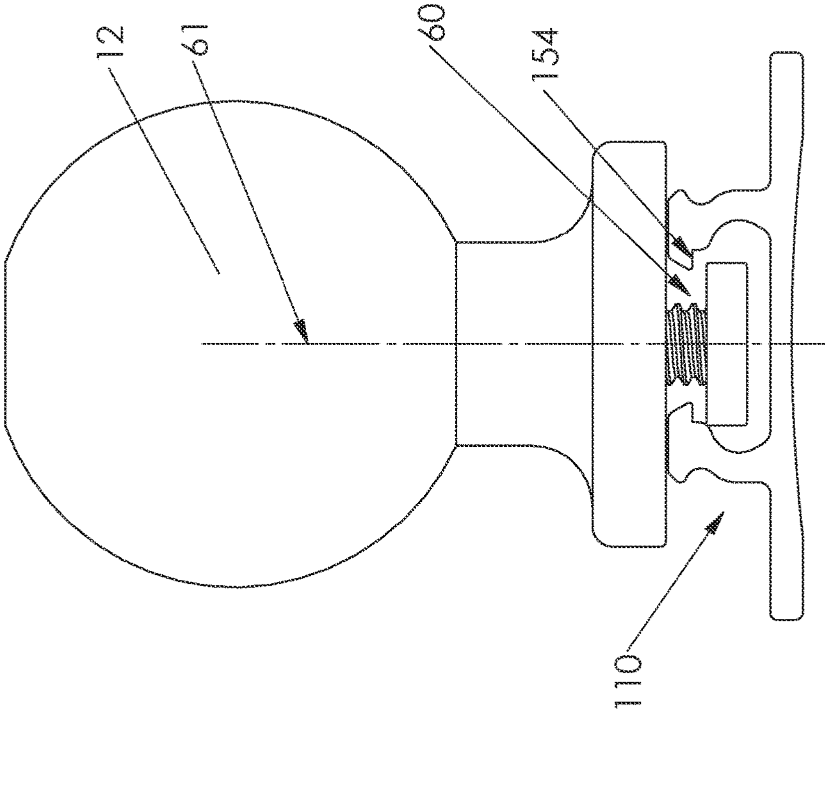

In FIG. 12 we can see the head 62 of the tee bolt 60 beginning to enter the clearance pocket 156 of the slot 150. It may be evident that when the head 62 is substantially inserted into the clearance pocket 156 of the slot 150, that the head 62 may fully clear the slot opening 152 so that the head 62 may attain a position that is fully contained in the slot 150 as shown in FIG. 13.

Looking at FIGS. 13-16, it can be seen that, as the tee bolt 60 is urged along its axis 61, as it may be when attaching the device 12, as described above, the head 62 of the tee bolt 60 may contact the containment ledge 154 on both sides, urged into this position by the slot guide 157. This prevents the tee bolt 60 from rotating about its axis 61 and enables secure connection of the device 12 to the alternative accessory mounting track 110 without requiring access to the proximal slot entry point 132 or distal slot entry point 136 of the accessory mounting track 110.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

10 accessory mounting track 10
12 device
13 mounting surface
14 supporting environmental surface
20 left support flange
22 right support flange
24 central axis
30 proximal end
32 proximal slot entry point
34 distal end 34
36 a distal slot entry point
40 attachment holes
42 countersink feature
44 concave recess
46 left interface flat
48 right interface flat
50 slot channel 50
52 slot opening
54 containment ledge
58 track upper surface
60 tee-bolt
62 head 62
64 stud 64
66 threads
68 head upper surface
70 female threads
110 alternative accessory mounting track
112 top-loading track section
114 base
116 beams
117 top surface
118 rails
118*a* inner wall
118*b* outer wall
120 left support flange
122 right support flange
124 central axis
130 proximal end
132 proximal slot entry point
134 distal end
136 distal slot entry point
150 space, slot or slot channel
152 gap or slot opening
154 bottom surface or containment ledge
156 insertion-pocket portion or clearance pocket
157 guide surface portion or slot guide
D1 first distance
D2 second distance
D3 third distance

What is claimed is:

1. An accessory mounting system comprising:
an accessory mounting track comprising:
a slot within the accessory mounting track,
a slot opening in an upper surface of the accessory mounting track in communication with the slot, the slot opening defining a first distance, and
a clearance pocket on opposing sides of the slot, the clearance pockets being laterally spaced apart from each other by a second distance that is larger than the first distance;
a guide-surface portion extending from an insertion-pocket portion toward an intersection with a bottom surface of a respective one of laterally spaced beams defining the slot opening, the intersections being laterally spaced apart from each other by a third distance that is larger than the first distance and smaller than the second distance; and
a device coupleable to the accessory mounting track, the device coupled to a retention element comprising a flange having a smallest lateral dimension that is greater than the first distance and at least one lateral dimension that is less than the second distance and at least one lateral dimension that is less than the third distance, the retention element being configured to be inserted into the slot by passing the flange of the retention element through the slot opening from a position above the accessory mounting track.

2. The accessory mounting track of claim 1, further comprising a recess beneath the accessory mounting track.

3. The accessory mounting track of claim 2, wherein the recess terminates at a first interface surface and a second interface surface on a bottom of the first support flange and the second support flange, respectively.

4. The accessory mounting track of claim 2, wherein the recess is concave or angular in shape.

5. The accessory mounting track of claim 1, further comprising:
one or more attachment holes linearly disposed parallel to a central axis of the accessory mounting track for attaching the accessory mounting track to the supporting surface by a track fastener through each of one or more of the attachment holes and securing the track fastener to the supporting surface.

6. The accessory mounting track of claim 5, wherein the one or more attachment holes are linearly disposed along laterally spaced support flanges.

7. The accessory mounting track of claim 5, wherein the one or more attachment holes have a countersink feature or a counter bore feature.

8. The accessory mounting track of claim 5, wherein the one or more attachment holes are linearly disposed approximately centered and along a long axis of the accessory mounting track.

9. The accessory mounting track of claim 8, wherein the one or more attachment holes have a countersink feature or a counter bore feature.

10. The accessory mounting track of claim 1, wherein the slot opening is bounded on each side by a containment ledge within the slot, the containment ledge at least partially defining the slot.

11. The accessory mounting track of claim 10, further comprising:

a slot guide between the clearance pocket and a containment ledge, the slot guide being sized and configured to guide the head of the fastener into contact with the containment ledge on each side of the slot opening to enable secure connection of a device to the accessory mounting track.

12. An accessory mounting system comprising:

an accessory mounting track comprising:

a base, two laterally spaced beams, each one of the beams extending over a portion of the base toward the other beam, each of the beams having a top surface and an opposing bottom surface, two rails extending from the base each one of the two rails connecting the base to a respective one of the two beams, each one of the rails comprising an inner rail wall and an opposing outer rail wall, a space within the accessory mounting track defined at least in part by the two beams and the two rails, a gap between the beams defining a first distance, and an insertion pocket portion on opposing sides of the space, the insertion pocket portions extending in a direction of a respective one of the outer rail walls, the insertion pocket portions being laterally spaced apart from each other by a second distance that is larger than the first distance;

a guide-surface portion extending in a direction away from the respective one of the outer rail walls from the insertion pocket portion to an intersection with the bottom surface of a respective one of the two beams, the intersections being laterally spaced apart from each other by a third distance that is larger than the first distance and smaller than the second distance; and an accessory device coupleable to the accessory mounting track, the device coupled to a retention element comprising a flange having a smallest lateral dimension that is greater than the first distance and at least one lateral dimension that is less than the second distance and at least one lateral dimension that is less than the third distance, the retention element being configured such that, when the flange of the retention element is substantially inserted into the insertion pocket portion, the flange of the retention element fully clears the gap to enable insertion of the flange of the retention element entirely through the gap from a position above the accessory mounting track.

13. The accessory mounting track of claim 12, further comprising a recess beneath the accessory mounting track.

14. A method of removably attaching the accessory device to the accessory mounting track of claim 12, the method comprising the steps of:

a) providing the accessory mounting system of claim 12, wherein the retention element comprises a threaded end, b) screwing the threaded end of the retention element into the accessory device, leaving the flange of the retention element extended some distance from the accessory device, c) inserting the flange of the retention element substantially through the gap and into the space so that the flange of the retention element fully clears the gap so that the flange of the retention element attains a position that is contained within the space, d) rotating the retention element in the space to orient the flange of the retention element to capture the flange of the retention element in the space, while allowing movement only along a long central axis of the track, e) tightening the device to the track by rotating the device so that interaction between threads in the device and the threaded end of the retention element urges the flange of the retention element along the guide-surface portion towards the device and into contact with the bottom surface of the beam, and f) further rotating the device to cause the device to contact the top surface of the beam to produce pressure between the bottom surface of the beam and the flange of the retention element, resulting in friction that, with reasonable tightening force, is adequate to inhibit rotation of the device in either the tightening or the loosening direction or from slipping linearly along the track.

15. An accessory mounting system comprising:

an accessory mounting track comprising;

a base, two beams, each one of the beams extending over a portion of the base toward the other beam, each of the beams having a top surface and an opposing bottom surface, wherein the beams are laterally spaced apart gap having a first distance, two rails extending from the base, each one of the two rails connecting the base to a respective one of the two beams, each one of the rails comprising an inner rail wall and an opposing outer rail wall, wherein the inner rail wall of each of the two rails defines:

an insertion-pocket portion extending towards a respective one of the outer rail walls, and a guide-surface portion extending in a direction away from a respective one of the outer rail walls, from the insertion-pocket portion to an intersection with the bottom surface of a respective one of the two beams;

wherein the insertion-pocket portions are laterally spaced apart from each other by a second distance that is larger than the first distance and the intersections of the guide-surface portions with the respective bottom surfaces of the two beams are laterally spaced apart from each other by a third distance that is larger than the first distance and smaller than the second distance; and a device coupleable to the accessory mounting track, the device coupled to a retention element comprising a flange with a smallest lateral dimension that is greater than the first distance of the gap between the two beams and at least one lateral dimension that is less than the second distance between the insertion-pocket portions and at least one lateral dimension that is less than the third distance at the intersections of the respective guide-surface portions with the respective bottom surfaces of the two beams, the retention element configured to be inserted into the accessory mounting track by passing the retention element through the gap between the two beams from a position above the top surfaces of the two beams.

16. A top-loading mounting track system, comprising:

a top-loading mounting track comprising at least one top-loading track section, the top-loading track section comprising:

a base, two beams, wherein each of the beams extends over a portion of the base toward the other beam, wherein each of the beams has a top surface and an opposing bottom surface, wherein the beams are laterally spaced apart from each other by a gap having a first distance, and two rails extending opposite each other from the base, each rail of the two rails connecting the base to a different one of the two beams, each rail comprising an inner rail wall and an opposing outer rail wall, wherein the inner rail wall of each of the two rails defines an insertion-pocket portion of the inner rail wall extending towards the opposing outer rail wall, and an angled guide-surface portion of the inner rail wall extending at an angle away from the opposing outer rail wall from the insertion-pocket portion to an intersection with the bottom surface of one of the two beams, wherein the insertion-pocket portions of the inner rail walls of the two rails are laterally spaced apart from each other by a second distance that is larger than the first distance and the intersections of the respective angled guide-surface portions with the respective bottom surfaces of the two beams are laterally spaced apart from each other by a third distance that is larger than the first distance and smaller than the second distance; and a mount assembly coupleable to the top-loading mounting track, the mount assembly comprising a mount coupled to a retention element comprising a flange with a smallest lateral dimension that is greater than the first distance of the gap between the two beams of the top-loading mounting track and at least one lateral dimension that is less than the second distance between the insertion-pocket portions of the two rails of the top-loading mounting track and at least one lateral dimension that is less than the third distance at the intersections of the respective guide-surface portions with the respective bottom surfaces of the two beams, the retention element configured and arranged for insertion into the top-loading mounting track by passing the retention element through the gap between the two beams of the at least one top-loading track section from a position over the top surfaces of the two beams.

17. The top-loading track-mounting track system of claim 16, wherein the retention element is one of a T-bolt or a T-nut.

18. The top-loading track-mounting track system of claim 16, wherein the mount is a ball.

19. A method of coupling a mount assembly to a top-loading mounting track, the method comprising:

providing the top-loading mounting track system of claim 16; and inserting the retention element of the mount assembly into the at least one top-loading track section of the top-loading mounting track from a position over the top surfaces of the two beams of the at least one top-loading track section to retain the retention element within the top-loading mounting track.

20. The method of claim 19, wherein inserting retention element of mount assembly into the at least one top-loading track section comprises: tilting the mount assembly to a non-parallel angle relative to a first axis of the at least one top-loading track section, the first axis defined by opposing tips of the two beams of the at least one top-loading track section;

extending a first end of the retention element through the gap between the two beams of the at least one top-loading track section and into the insertion-pocket portion of one of the two rails; and pivoting the mount assembly about the first end of the retention element to extend an opposing second end of the retention element through the gap between the two beams and into the insertion-pocket portions of the other of the two rails.

21. The method of claim 20, further comprising tightening the mount assembly against the at least one top-loading track section to retain the mount assembly at a mounting location along a length of the top-loading mounting track.

22. The method of claim 21, wherein tightening the mount assembly against the at least one top-loading track section comprises:

moving the retention element from the insertion-pocket portions away from the base along the angled guide-surface portions of the two rails to the bottom surfaces of the two beams, the angled guide-surface portions of the two rails facilitating guidance of the retention element to a position beneath the bottom surfaces of the two beams; and pressing the two beams between a top surface of the retention element and a bottom surface of a mount of the mount assembly to retain the mount assembly.

23. The method of claim 19, further comprising fastening the top-loading mounting track to a surface.

* * * * *